United States Patent [19]

Gouldthorpe

[11] 3,721,979

[45] March 20, 1973

[54] DETECTION IN A MULTIPLE-TARGET ENVIRONMENT

[75] Inventor: Hugh W. Gouldthrope, Cazenovia, N.Y.

[73] Assignee: United States of America as represented by the Secretary of the Army

[22] Filed: Sept. 10, 1971

[21] Appl. No.: 179,381

[52] U.S. Cl. .....................343/7 A, 343/5 R, 343/7.3
[51] Int. Cl. ...............................................G01s 9/02
[58] Field of Search .......................343/5 R, 7 A, 7.3

[56] References Cited

UNITED STATES PATENTS

| | | | |
|---|---|---|---|
| 3,444,553 | 5/1969 | Tsumura et al. | 343/5 R |
| 3,249,934 | 5/1966 | Hague | 343/7.3 |
| 3,588,896 | 6/1971 | Duarte | 343/5 PC |

Primary Examiner—T. H. Tubbesing
Attorney—Charles K. Wright et al.

[57] ABSTRACT

A radar processor is divided into parallel channels for processing of the radar input information. One channel is a regular channel in which signals not having a large return therein are processed. Two other channels have their input therein controlled by a gate means which allows the radar returns only during the time a large signal return is present to be fed into one channel and allowing the remaining returns to enter into the other channel. In the channel in which the large signal return is allowed to be processed, an Nth law device and a zonal filter provide for enhancement of small returns which are included along with the large return. In this way the small returns can also be processed.

2 Claims, 1 Drawing Figure

PATENTED MAR 20 1973  3,721,979
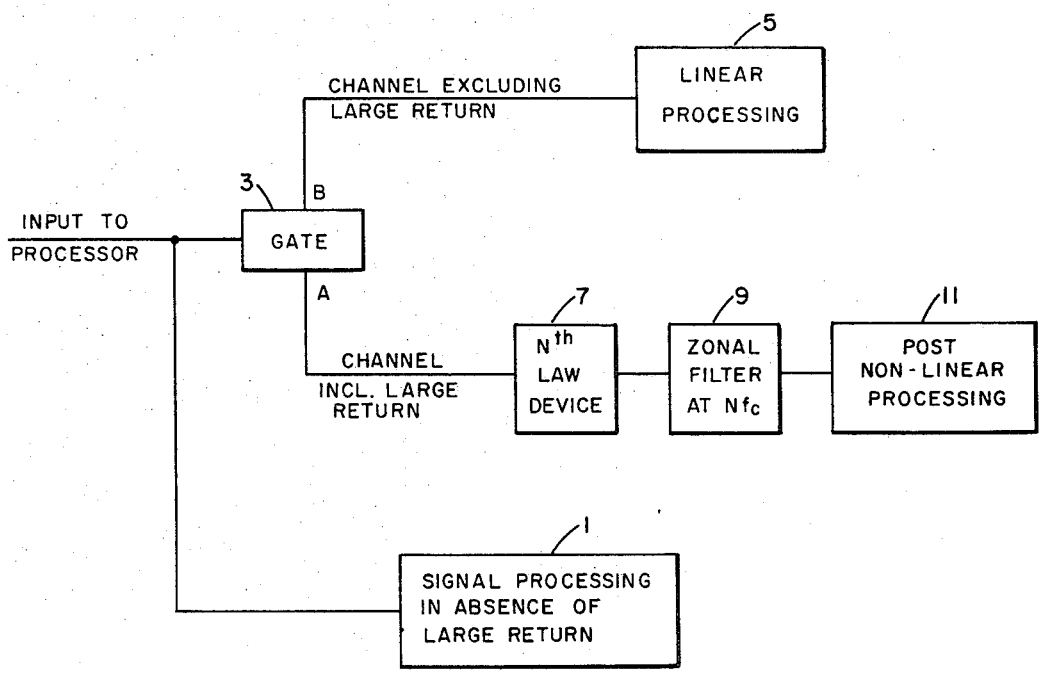
Hugh W. Gouldthrope,
INVENTOR
BY Jack W. Voigt
Robert C. Lims

DETECTION IN A MULTIPLE-TARGET ENVIRONMENT

BACKGROUND OF THE INVENTION

This invention is related to the field of radar detecting devices in which detection is made in a multiple target environment. More particularly this invention is related to the processing of both large and small returns which are detected by the radar. In an environment containing multiple targets of widely differing cross-sections, detection of smaller targets may be inhibited by the minor lobes of the radar's response to the larger targets. Many of today's radar problems are caused by an encounter with a multiple target environment established by discrimination clouds, congested air traffic, intercept missiles, threatening missiles, etc. The variation of the cross-sections of these targets may cover a dynamic range in excess of 50 db ($10^{-4}$ to 100 m² at microwave frequencies, 0.10 to 1,000 m² at VHF). A good signal processor will achieve $-30$ db minor lobes to reject targets at ranges and/or velocities differing from the resolution cell under examination, while the most ambitious processors will attempt a $-40$ db minor lobe level. Clearly, this is insufficient to allow detection of smaller targets that are in the proximity of the larger targets.

SUMMARY OF THE INVENTION

In order to provide enhancement of smaller target signals which are present in the proximity of larger target signals, a parallel channel processor has been devised. One of the channels is a conventional signal processor for use when no large returns exists. When there is a large return the strength of the reflection from it is such that a gate may be accurately positioned to separate that portion of the return containing the large signal from the portion in which negligible energy from the large target is presented. The portion of the signal excluding the large target return is sent to one channel to undergo the normal linear processing of a radar system. Without the gate this could not be done as the large target would extend its influence over twice the range that it affects with the use of the gate at the processor input.

The channel which receives the large return signals may also receive therewith a small return that would not be visible with linear processing. Therefore, an Nth law device is provided to enhance the return from the small target by a factor of N in voltage relative to the large return. At the output of the Nth law device a zonal filter centered at the Nth harmonic is provided so that only frequencies at the Nth harmonic will be passed. A non-linear processing unit is provided at the output of the zonal filter so as to provide target information.

BRIEF DESCRIPTION OF THE DRAWING

The single FIGURE shows a block diagram illustrating the preferred embodiment of the invention.

DESCRIPTION OF THE PREFERRED EMBODIMENT

The single FIGURE shows a processor which has an input from a radar receiver (not shown). The processor is made up of three parallel channels. The first channel is fed to device 1 where the signals are processed in the normal manner. The device 1 can be any of the well known processors, and its results will be used when there is an absence of a large signal return. The input is also fed to gate 3 which separates the signals into two paths A and B. Path A will have the input fed to it during the time that large return signals are being fed from the input. Path B will have signals fed to it during the time that large signals are not being fed from the input. Channel B has a linear processor 5 where the radar information is processed in the same manner as that of device 1. Without gate 3 a small return may not be visible with linear processing. However, even with gate 3 if the small return is close to the signal of the large return, gate 3 may pass it along with the large return into channel A. Gate 3 could be any of the well known range gates used in common radar devices with the common gated output being fed to channel A and during the off-time of the gate the information is fed to channel B. Gate 3 could further take the structure of a common range gate connected between the input to the processor and channel A, and a controllable switch connected between input to the processor and channel B. The control for this switch (which could be a transistor) being connected to the output of the range gate so as to cause closing of the switch when channel B does not have an output.

As noted above, channel A may have both large and small target returns therein. With linear processing the small return would most likely not be visible. Therefore, an Nth law device 7 is provided for enhancement of the small return by a factor of N in voltage relative to the large return. This may be seen from the binomial expansion of the Nth law device's transfer characteristic with a large input signal $y_1(t)$ and a small signal $y_2(t)$.

$$y_0(t) = \alpha [y_1(t) + y_2(t)]^N \quad (1)$$
$$= \alpha [y_1^N(t) + N y_1^{N-1}(t) y_2(t) + \ldots$$

The remaining terms of the expansion are negligible for $$\frac{\overline{y_1^2(t)}}{\overline{y_2^2(t)}} \gg 1$$

The ratio of the power in the first two terms of the expansion is $$\frac{P_2}{P_1} = \frac{N^2 \overline{y_1^{2(N-1)}(t) y_2^2(t)}}{\overline{y_1^{2N}(t)}} = N^2 \frac{\overline{y_2^2(t)}}{\overline{y_1^2(t)}}$$

$y_1$ and $y_2$ independent which demonstrates the power enhancement of $N_2$.

In a general non-linear device, there exist non-linearites other than the Nth order term that could introduce confusion. Terms of lower order may have an appreciable effect on the output. However, in the spectral zone surrounding the Nth harmonic of the input band center frequency, the output behaves predictably. The Nth law device is therefore followed by a zonal filter 9 centered at this Nth harmonic.

The non-linear relationship between input and output suggests that some change of the spectral characteristics may occur. The output spectrum is, in general, an N-fold self convolution of the input spectrum. For the important case of no amplitude modulation of the transmitted signal (aside from pulsing), each of the terms of Equation (1) will also have no amplitude modulation. The phase modulation is increased by a factor of N however. For the case of a simple pulse, the output spectrum retains the same shape and width. For a phase modulated transmit pulse, the increased modulation will usually broaden the spectrum of the output although there are special cases when the output spectrum is unchanged or narrowed. The required processing for several phase modulation types will be discussed later.

A Nth law device of this invention can take the form of a XN frequency mulitplier. The multiplier considered here is saturated and hence the output contains only phase modulation. The presence of one small signal along with the large signal at the multiplier input will produce a slight amplitude and slight phase modulation of the large signal. At the multiplier output the amplitude modulation is eliminated and the phase modulation increased by a factor of N, as may be seen from the input and output expressions, $$X_{in}(t) = A \cos[(\omega_L t + \theta_L(t)] + B \cos(\omega_s t + \theta_s(t)] \quad (2)$$
$$\approx A[1 + \epsilon \cos(\delta t + \gamma(t))] \cos I\omega_L t + \theta_L(t) - \epsilon \sin(\delta t + \gamma(t))$$
$$\epsilon = B/A$$
$$\delta = \omega_S - \omega_L$$
$$\gamma(t) = \theta_S(t) - \theta_L(t)$$

so that the output contains the input interference enhanced in power by $N^2/2$ and a companion interference signal that provides the pure phase modulation. This companion signal does not affect the detection of the smaller signal, but subsequent processing must determine which is the true target return if tracking is to be undertaken.

POST NON-LINEAR PROCESSING

The processing required following the Nth law device depends on the radar's waveform. Several commonly used waveforms will be considered here.

CHIRP PULSE

Any range/velocity separation between large and small targets, other than along the principal ambiguity axis will result in a frequency modulation of the large signal 7 return by the small signal. The frequency multiplication results in an approximate N-fold increase in the spectral width of the chirp signals at the output. Passive de-chirping techniques may be very difficult, but active de-chirping with a similarly multiplied version of the transmitted signal will result in CW pulses out that may be processed in the same manner as was discussed previously.

PHASE-CODED WAVEFORM

If the waveform consists of a number of phase-coded subpulses, the part of the multiplier output containing the small signal will have a phase coding that is (N-1) times the coding of the large signal, plus the phase of the small return. The resultant total phase is dependent on the amount of overlap between the two signals and on their relative doppler. If the (N-1) times the large targets phase is removed, the resulting signal may be processed by means similar to those used for a signal in the clear. If the phase code is selected so that all the subpulse phases obey the relationship $(N-1) \phi_K = M \times 2$ where M is an integer, the $(N-1) \phi_K$'s are automatically removed. If the subpulses are simple pulses, no spectrum spreading will be observed at the multiplier output.

The Nth law device 7 can be any of the well known non-linear devices which use diodes. The circuitry would be similar to that used for harmonic generation of frequency multiplication. Description of suitable circuitry may be found in an article in the Microwave Journal, volume 10, April, 1967, entitled "Shunt-Mode Harmonic Generation Using Step Recovery Diodes" by Robert Hall. The zonal filter 9 may be a bandpass filter device. In this case it is only required that the filter have a bandwidth that will accept the Nth harmonic of interest and reject all other harmonics. For the typical application in this invention the design may be of any of the several known types such as Butterworth or Chebycheff. Characteristics are shown in McGraw-Hill's publication of Microwave Filters, Impedence Matching Networks, and Coupling Structures by Matthaei, Young and Jones, pp 448–449, and in Microwave Journal annual publication of Engineers Technical and Buyers Guide Edition (1970 edition has filter responses on pp 37–40).

In operation the processor receives radar information from the receiver not shown and this information is fed to the signal processor 1 which will process this information in the manner well known in the art. If a large return is included further processing is required by channels A and B which are fed by gate 3. Gate 3 is a range gate type device which allows all signals during the range gate of a large return to flow to channel A and all signals other than those gated to channel A flow through channel B. Signals flowing through channel B are fed to a linear processor 5 which processes the radar information in the same manner as is well known in the art. Information fed through channel A has the small returns, if they are present, enhanced by the Nth law device 7. A zonal filter is provided to reject unwanted frequencies and the output is fed to a post non-linear system 11 which will provide information on both large returns and small returns at the same time.

I claim:

1. A processing system having a gate which has an input and outputs (1) and (2); signal information which may contain periodic large valued information and/or periodic small valued information; said input being connected to receive said signal information; said gate is so designed that during the time that large signal returns are present on the input, the signal information is fed to output (1) and during remaining time, the signal information is fed to output (2); first processor connected to the first output of said gate; a second processor connected to the second output of said gate; a small signal enhancing device having an input connected to the output (1) of said gate; filter means; an output of said signal enhancing device being connected through said filter means to said first processor; said signal information is radar returns from a radar receiver; and wherein said small signal enhancing device is a Nth law device.

2. A claim as set forth in claim 1 further comprising a third processor connected to receive said signal information directly; and wherein said first processor provides post non-linear processing.

* * * * *